(12) United States Patent
Wang

(10) Patent No.: US 9,425,646 B2
(45) Date of Patent: Aug. 23, 2016

(54) FAST CHARGING APPARATUS

(71) Applicant: Chicony Power Technology Co., Ltd., New Taipei (TW)

(72) Inventor: Yang Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 203 days.

(21) Appl. No.: 14/226,283

(22) Filed: Mar. 26, 2014

(65) Prior Publication Data

US 2015/0280485 A1    Oct. 1, 2015

(51) Int. Cl.
*H02J 7/00* (2006.01)
*H02J 7/04* (2006.01)

(52) U.S. Cl.
CPC ...... *H02J 7/04* (2013.01); *H02J 7/0052* (2013.01)

(58) Field of Classification Search
CPC .................................................. H02J 7/0052
USPC .......................................................... 320/107
See application file for complete search history.

(56) References Cited

U.S. PATENT DOCUMENTS

| | | | | |
|---|---|---|---|---|
| 5,847,543 A * | 12/1998 | Carroll | ........................ | 320/125 |
| 5,994,875 A * | 11/1999 | Lee | ............................... | 320/132 |
| 8,018,204 B2 * | 9/2011 | Bourilkov et al. | ........... | 320/137 |
| 8,264,198 B2 * | 9/2012 | Sato et al. | ..................... | 320/112 |
| 9,209,676 B2 * | 12/2015 | Geren | ............................ | 320/125 |
| 2009/0184687 A1* | 7/2009 | Schroeder et al. | ............ | 320/162 |
| 2009/0195230 A1* | 8/2009 | Adkins et al. | ................. | 323/282 |
| 2015/0249393 A1* | 9/2015 | Zhang et al. | ................. | 320/112 |

* cited by examiner

*Primary Examiner* — Suchin Parihar
(74) *Attorney, Agent, or Firm* — Muncy, Geissler, Olds & Lowe, P.C.

(57) ABSTRACT

A fast charging apparatus includes a power conversion unit, a feedback module, a feedback adjustment module and a voltage mode fast charging signal processing module. The power conversion unit includes a pulse width modulation controller. The pulse width modulation controller includes an electronic apparatus current fast charging signal detection unit. The feedback module informs the power conversion unit to increase a charging power for an electronic apparatus if the electronic apparatus sends a voltage mode fast charging signal to the voltage mode fast charging signal processing module. The electronic apparatus current fast charging signal detection unit informs the power conversion unit to increase the charging power for the electronic apparatus if the electronic apparatus current fast charging signal detection unit detects a current mode fast charging signal sent from the electronic apparatus.

8 Claims, 3 Drawing Sheets

FAST CHARGING APPARATUS

BACKGROUND OF THE INVENTION

1. Field of the Invention

The present invention relates to a fast charging apparatus, and especially relates to an improved fast charging apparatus.

2. Description of the Related Art

Currently, there are two types of fast charging signals sent from an electronic apparatus to a charger, wherein the charger will enter a fast charging mode after receiving the fast charging signal. The two types of fast charging signals are the voltage mode signal and the current mode signal. Different electronic apparatuses use (namely, send) different fast charging signals. However, a conventional charger can only recognize the voltage mode signal or the current mode signal.

Therefore, a charger which can only recognize the voltage mode signal cannot fast charge an electronic apparatus which uses the current mode signal. A charger which can only recognize the current mode signal cannot fast charge an electronic apparatus which uses the voltage mode signal.

SUMMARY OF THE INVENTION

In order to solve the above-mentioned problems, an object of the present invention is to provide a fast charging apparatus.

In order to achieve the object of the present invention mentioned above, the fast charging apparatus is applied to an alternating current power supply apparatus and an electronic apparatus. The fast charging apparatus includes a power conversion unit, a feedback module, a feedback adjustment module and a voltage mode fast charging signal processing module. The power conversion unit is electrically connected to the alternating current power supply apparatus and the electronic apparatus. The feedback module is electrically connected to the power conversion unit. The feedback adjustment module is electrically connected to the feedback module. The voltage mode fast charging signal processing module is electrically connected to the electronic apparatus and the feedback adjustment module. The voltage mode fast charging signal processing module receives a voltage mode fast charging signal if the electronic apparatus sends the voltage mode fast charging signal to the voltage mode fast charging signal processing module. The voltage mode fast charging signal processing module sends the voltage mode fast charging signal to the feedback adjustment module. The feedback adjustment module sends the voltage mode fast charging signal to the feedback module. Therefore, the feedback module informs the power conversion unit to increase a charging power for the electronic apparatus. The power conversion unit includes a pulse width modulation controller. The pulse width modulation controller is electrically connected to the feedback module. The pulse width modulation controller includes an electronic apparatus current fast charging signal detection unit. A current flowing through the electronic apparatus is changed to be a current mode fast charging signal if the electronic apparatus changes a specific load of the electronic apparatus. The electronic apparatus current fast charging signal detection unit informs the power conversion unit to increase the charging power for the electronic apparatus if the electronic apparatus current fast charging signal detection unit detects the current mode fast charging signal.

The efficiency of the present invention is to integrate the voltage mode fast charging charger with the current mode fast charging charger.

DETAILED DESCRIPTION OF THE INVENTION

Figure 1:
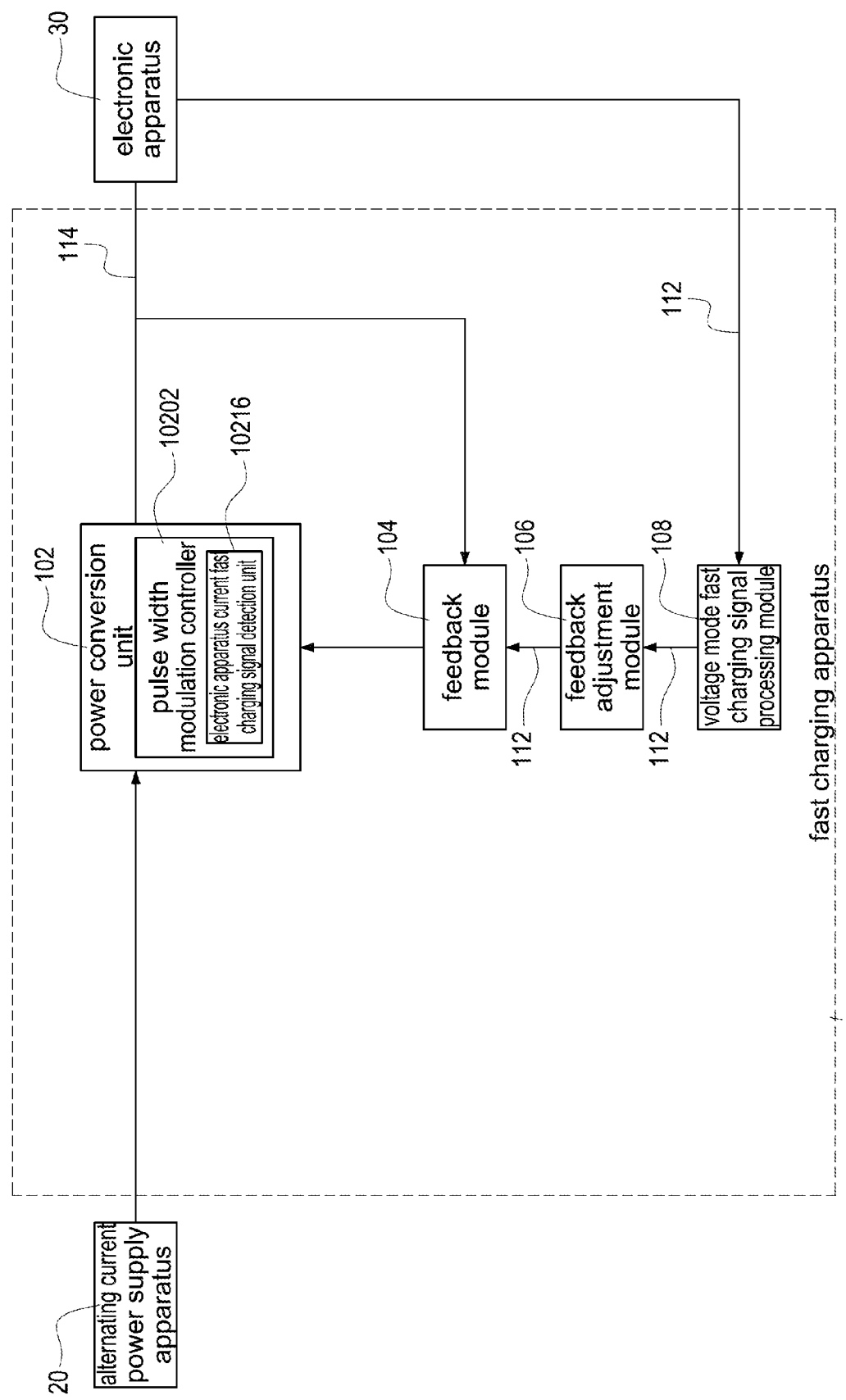
FIG. 1 shows a block diagram of the first embodiment of the fast charging apparatus of the present invention.

FIG. 1 shows a block diagram of the first embodiment of the fast charging apparatus of the present invention. A fast charging apparatus 10 is applied to an alternating current power supply apparatus 20 and an electronic apparatus 30. The fast charging apparatus 10 includes a power conversion unit 102, a feedback module 104, a feedback adjustment module 106 and a voltage mode fast charging signal processing module 108.

The power conversion unit 102 is electrically connected to the alternating current power supply apparatus 20 and the electronic apparatus 30. The feedback module 104 is electrically connected to the electronic apparatus 30 and the power conversion unit 102. The feedback adjustment module 106 is electrically connected to the feedback module 104. The voltage mode fast charging signal processing module 108 is electrically connected to the electronic apparatus 30 and the feedback adjustment module 106.

The voltage mode fast charging signal processing module 108 receives a voltage mode fast charging signal 112 if the electronic apparatus 30 sends the voltage mode fast charging signal 112 to the voltage mode fast charging signal processing module 108. The voltage mode fast charging signal processing module 108 sends the voltage mode fast charging signal 112 to the feedback adjustment module 106. The feedback adjustment module 106 sends the voltage mode fast charging signal 112 to the feedback module 104. Therefore, the feedback module 104 informs the power conversion unit 102 to increase a charging power for the electronic apparatus 30 (namely, the power conversion unit 102 enters a fast charging mode).

The power conversion unit 102 includes a pulse width modulation controller 10202. The pulse width modulation controller 10202 is electrically connected to the feedback module 104. The pulse width modulation controller 10202 includes an electronic apparatus current fast charging signal detection unit 10216.

A current flowing through the electronic apparatus 30 is changed to be a current mode fast charging signal 114 (for example, the electronic apparatus 30 generates a plurality of pulse currents to send to the fast charging apparatus 10) if the electronic apparatus 30 changes a specific load of the electronic apparatus 30. The electronic apparatus current fast charging signal detection unit 10216 informs the power conversion unit 102 to increase the charging power for the electronic apparatus 30 (namely, the power conversion unit 102 enters the fast charging mode) if the electronic apparatus current fast charging signal detection unit 10216 detects the current mode fast charging signal 114. The current mode fast charging signal 114 is, for example but not limited to, a pulse signal which includes three pulses.

In another word, there are two methods if the electronic apparatus 30 wants to inform the fast charging apparatus 10 to enter the fast charging mode:

1. The electronic apparatus 30 sends the voltage mode fast charging signal 112 to the fast charging apparatus 10. This is called the voltage mode fast charging.

2. The electronic apparatus 30 changes the specific load of the electronic apparatus 30. Then, the current flowing through the electronic apparatus 30 is changed to be the current mode fast charging signal 114 (for example, the electronic apparatus 30 generates the pulse currents to send to the fast charging apparatus 10). The electronic apparatus current fast charging signal detection unit 10216 detects the current mode fast charging signal 114, and then the electronic apparatus current fast charging signal detection unit 10216 informs the power conversion unit 102 to increase the charging power for the electronic apparatus 30. This is called the current mode fast charging.

Figure 2:
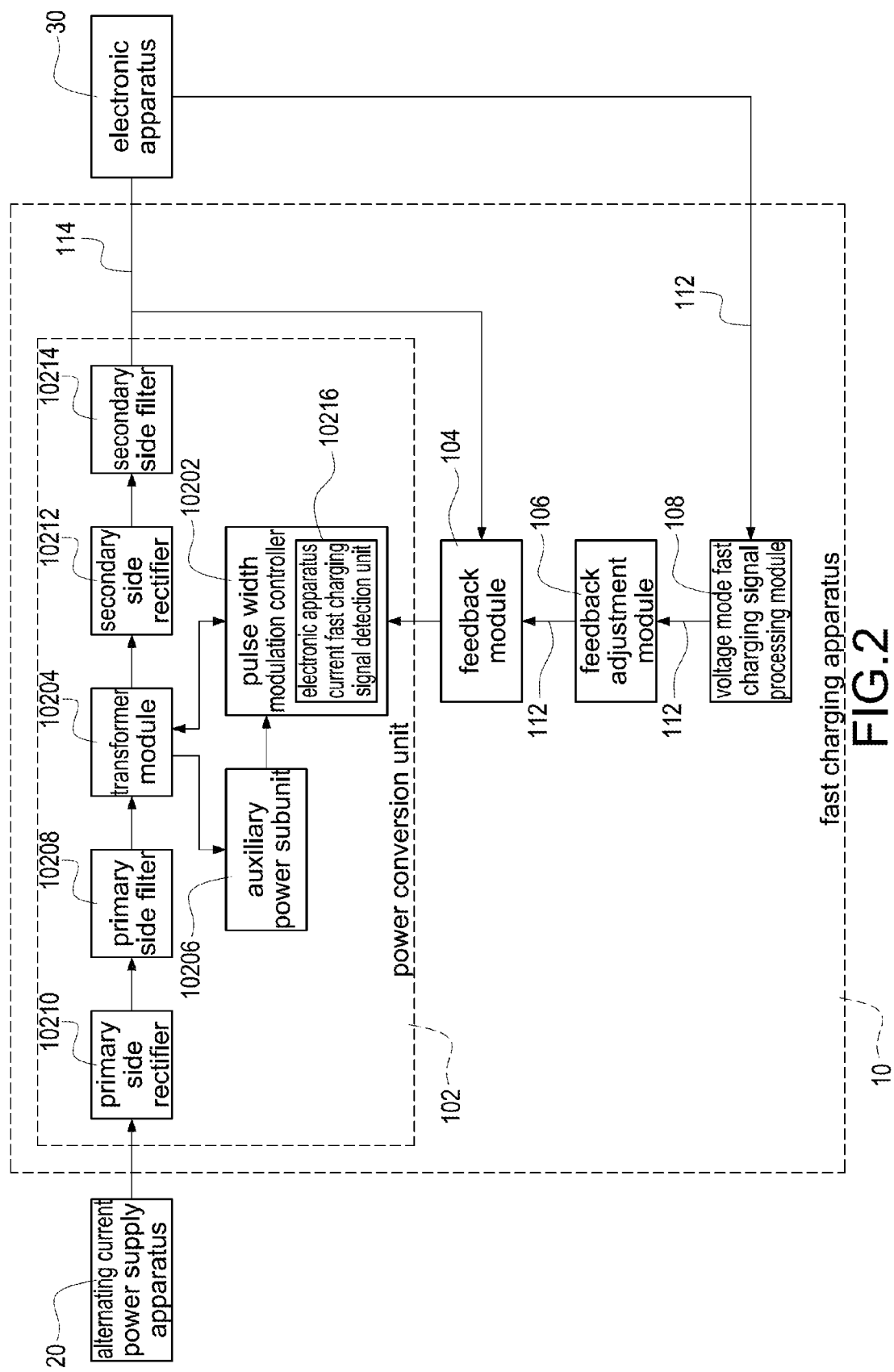
FIG. 2 shows a block diagram of the second embodiment of the fast charging apparatus of the present invention.

FIG. 2 shows a block diagram of the second embodiment of the fast charging apparatus of the present invention. The description for the elements shown in FIG. 2, which are similar to those shown in FIG. 1, is not repeated here for brevity. The power conversion unit 102 includes a transformer module 10204, an auxiliary power subunit 10206, a primary side filter 10208, a primary side rectifier 10210, a secondary side rectifier 10212 and a secondary side filter 10214.

The transformer module 10204 is electrically connected to the pulse width modulation controller 10202. The auxiliary power subunit 10206 is electrically connected to the pulse width modulation controller 10202 and the transformer module 10204. The primary side filter 10208 is electrically connected to the transformer module 10204. The primary side rectifier 10210 is electrically connected to the primary side filter 10208 and the alternating current power supply apparatus 20. The secondary side rectifier 10212 is electrically connected to the transformer module 10204. The secondary side filter 10214 is electrically connected to the secondary side rectifier 10212, the feedback module 104 and the electronic apparatus 30.

Figure 3:
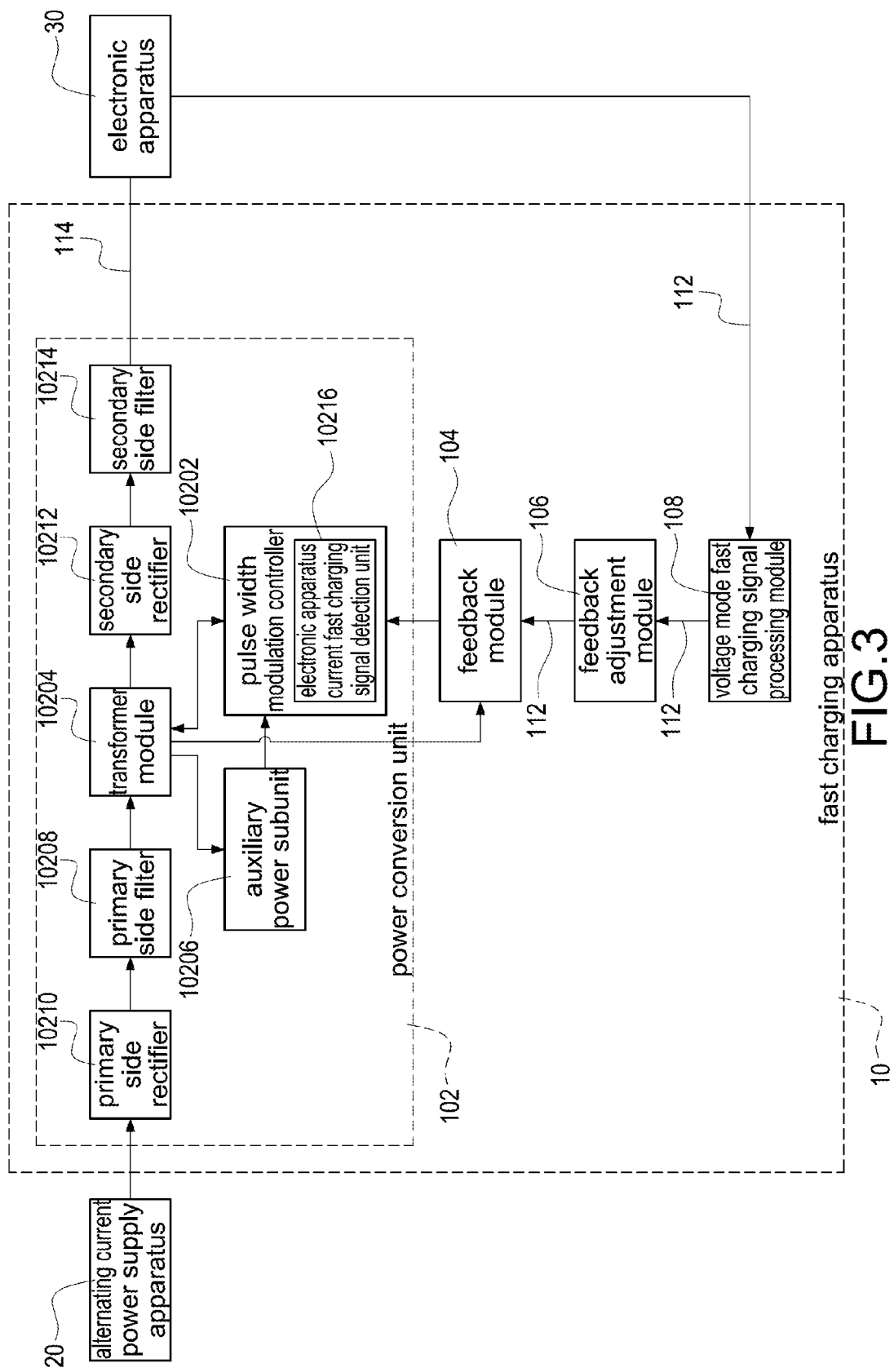
FIG. 3 shows a block diagram of the third embodiment of the fast charging apparatus of the present invention.

FIG. 3 shows a block diagram of the third embodiment of the fast charging apparatus of the present invention. The description for the elements shown in FIG. 3, which are similar to those shown in FIG. 2, is not repeated here for brevity. Moreover, the feedback module 104 is electrically connected to the transformer module 10204 (the primary side of the transformer module 10204).

The advantage of the present invention is to integrate the voltage mode fast charging charger with the current mode fast charging charger.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A fast charging apparatus applied to an alternating current power supply apparatus and an electronic apparatus, the fast charging apparatus comprising:
    a power conversion unit electrically connected to the alternating current power supply apparatus and the electronic apparatus;
    a feedback module electrically connected to the power conversion unit;
    a feedback adjustment module electrically connected to the feedback module; and
    a voltage mode fast charging signal processing module electrically connected to the electronic apparatus and the feedback adjustment module,
    wherein the voltage mode fast charging signal processing module receives a voltage mode fast charging signal if the electronic apparatus sends the voltage mode fast charging signal to the voltage mode fast charging signal processing module; the voltage mode fast charging signal processing module sends the voltage mode fast charging signal to the feedback adjustment module; the feedback adjustment module sends the voltage mode fast charging signal to the feedback module; therefore, the feedback module informs the power conversion unit to increase a charging power for the electronic apparatus;
    wherein the power conversion unit comprises a pulse width modulation controller; the pulse width modulation controller is electrically connected to the feedback module; the pulse width modulation controller comprises an electronic apparatus current fast charging signal detection unit;
    wherein a current flowing through the electronic apparatus is changed to be a current mode fast charging signal if the electronic apparatus changes a specific load of the electronic apparatus; the electronic apparatus current fast charging signal detection unit informs the power conversion unit to increase the charging power for the electronic apparatus if the electronic apparatus current fast charging signal detection unit detects the current mode fast charging signal;
    wherein the power conversion unit further comprises a transformer module electrically connected to the pulse width modulation controller and a primary side rectifier electrically connected to the alternating current power supply apparatus.

2. The fast charging apparatus in claim 1, wherein the power conversion unit further comprises an auxiliary power subunit electrically connected to the pulse width modulation controller and the transformer module.

3. The fast charging apparatus in claim 2, wherein the power conversion unit further comprises a primary side filter electrically connected to the transformer module.

4. The fast charging apparatus in claim 3, wherein the power conversion unit further comprises a secondary side rectifier electrically connected to the transformer module.

5. The fast charging apparatus in claim 4, wherein the power conversion unit further comprises a secondary side filter electrically connected to the secondary side rectifier and the electronic apparatus.

6. The fast charging apparatus in claim 5, wherein the feedback module is electrically connected to the electronic apparatus and the secondary side filter.

7. The fast charging apparatus in claim 5, wherein the feedback module is electrically connected to the transformer module.

8. The fast charging apparatus in claim 1, wherein the current mode fast charging signal is a plurality of pulse currents.

* * * * *